US00RE36827E

United States Patent [19]

Belokin et al.

[11] E Patent Number: Re. 36,827

[45] Reissued Date of Patent: Aug. 22, 2000

[54] BOTTLE RACK FOR REFRIGERATED DISPLAY

[76] Inventors: Paul Belokin; Martin P. Belokin, both of P.O. Box 1907, Denton, Tex. 76202; Norman P. Belokin, 3341 Evers Parkway, Denton, Tex. 76207

[21] Appl. No.: 08/723,481

[22] Filed: Oct. 9, 1996

Related U.S. Patent Documents

Reissue of:

[64] Patent No.: 5,358,128
Issued: Oct. 25, 1994
Appl. No.: 08/155,596
Filed: Nov. 22, 1993

[51] Int. Cl.[7] ..... A47F 7/00

[52] U.S. Cl. ..... 211/75; 211/88

[58] Field of Search ..... 211/75, 87, 88, 211/13; 248/206.2, 206.3

[56] References Cited

U.S. PATENT DOCUMENTS

D. 171,595 3/1954 Harriton .
2,508,945 5/1950 Heuer .
2,512,502 6/1950 Paschell .
2,647,786 8/1953 Locke .
2,711,830 6/1955 Howell .
4,984,693 1/1991 Belokin, Jr. et al. .
5,039,046 8/1991 Brewster .

*Primary Examiner*—Alvin C. Chin-Shue
*Assistant Examiner*—Sarah L. Purol
*Attorney, Agent, or Firm*—Jack A. Kanz

[57] ABSTRACT

A display rack is mounted to an internal surface of *a* transparent panel in *a* refrigerated vault to support and display bottles through the transparent panel. The display rack has a back wall for mounting the rack and a ledge extending from the back wall which has a generally horizontal portion adjacent the back wall and [a] *an* upwardly deflected portion distal from the back wall. A plurality of slots are formed in the ledge for receiving the neck portions of the bottles. Each slot is of a size adapted to receive the neck portion of a bottle but smaller than the top portion used *for* sealing the bottle, whereby the edges of the slots in the ledge can support the bottle at its neck and the body portion of the body of the bottle can be easily grasped for selection and removal from the display rack.

19 Claims, 5 Drawing Sheets

BOTTLE RACK FOR REFRIGERATED DISPLAY

Matter enclosed in heavy brackets [ ] appears in the original patent but forms no part of this reissue specification; matter printed in italics indicates the additions made by reissue.

This invention relates to refrigerated display of bottled products. More particularly, it relates to improved racks mounted to an interior surface of a transparent door of a refrigerated vault or the like for prominently displaying refrigerated bottled products.

BACKGROUND OF THE INVENTION

Retail businesses commonly display chilled products for sale in refrigerated units having a transparent door panel. Because a passing customer is more likely to select and purchase products displayed where they can be readily seen and recognized, the retailer desires to maximize visibility of products on display and also to maximize the utilization of space within the refrigerated area. Sometimes the retailer desires to change the arrangement of items on display or place special promotional products in particularly visible positions in refrigerated vaults or the like. The present invention provides display racks for supporting a plurality of bottles adjacent an interior surface of a refrigerated compartment such as the interior surface of a transparent wall or door.

Many bottles have a relatively narrow neck portion bounded by a body portion and upper top portion. The top portion of most bottles, particularly plastic beverage bottles, have a screw cap and an outwardly extending flange portion formed on the neck. The top portion of other types of bottles may have a sealed cap which is larger in diameter then the neck portion of the bottle. According to the invention, the display rack supports such bottles at the relatively narrow neck portion of the bottles.

SUMMARY OF THE INVENTION

In general, the display rack of the invention has a back wall and a ledge extending from the back wall. The back wall is adapted to mount the display rack adjacent a generally vertical interior surface of a refrigerated compartment such as against a transparent door panel. The ledge has a generally horizontal portion adjacent the back wall and an upwardly deflected portion distal from the back wall. A plurality of spaced-apart slots are formed in the ledge for receiving the neck portions of the bottles. Each slot is of a size adapted to receive the neck portion of a bottle but smaller than the top portion above the neck, whereby the edges of the slots in the ledge can support the bottle at the neck.

In the preferred embodiment of the invention the display rack is mounted to a hinged transparent door of a refrigerated vault or the like. The upwardly deflected portion of the ledge assists in retaining bottles on the display rack when the door is rapidly opened or closed. The back wall of the display rack has a plurality of openings formed therein for connecting suction cups to the back wall so that the display rack can be removeably mounted to the interior wall or door of a refrigerated vault.

The display rack is preferably formed of substantially transparent material and mounted on the interior of a transparent refrigerator door panel so the bottles on the display rack can be viewed and identified through the transparent panel. The invention thus provides a display rack which supports bottles to be displayed while supported at the neck portion so that the body of the bottle can be easily grasped for selection and removal from the display rack. The rack is releaseably mounted to an interior wall or door of a refrigerated compartment to occupy otherwise wasted space and is formed of a sufficiently transparent material so that bottles supported thereon can be viewed and identified from outside the refrigerated compartment.

Other features and advantages of the invention will be apparent to those skilled in the art upon reading the following detailed description of preferred embodiments together with the appended claims and attached drawing in which:

Figure 1:
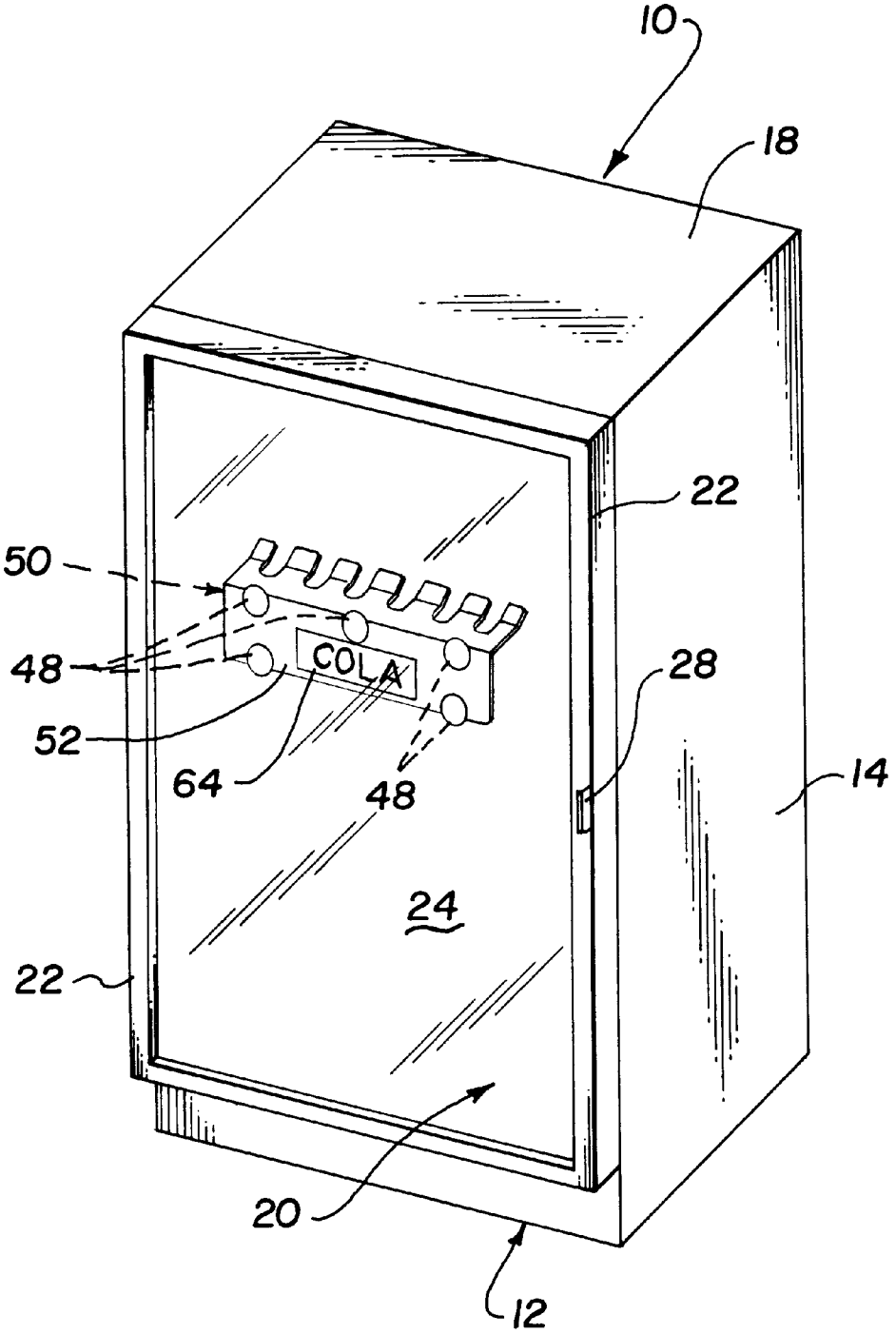
FIG. 1 is a perspective view of a refrigerated vault unit having a hinged door with a transparent panel for viewing products within the refrigerated compartment and a bottle display rack mounted to the interior of the transparent panel for displaying chilled bottled products.

The accompanying drawings are incorporated into and form a part of the specification to illustrate several examples of the present invention. Throughout the drawing, like reference numerals designate corresponding elements. This drawing, together with the description, serves to explain the principles of the invention and is only for the purpose of illustrating preferred and alternative examples of how the invention can be made and used. The drawings is not to be construed as limiting the invention to only the illustrated and described examples. Throughout the drawing, like reference numerals designate corresponding elements.

DESCRIPTION OF THE PREFERRED EMBODIMENTS

Figure 2:
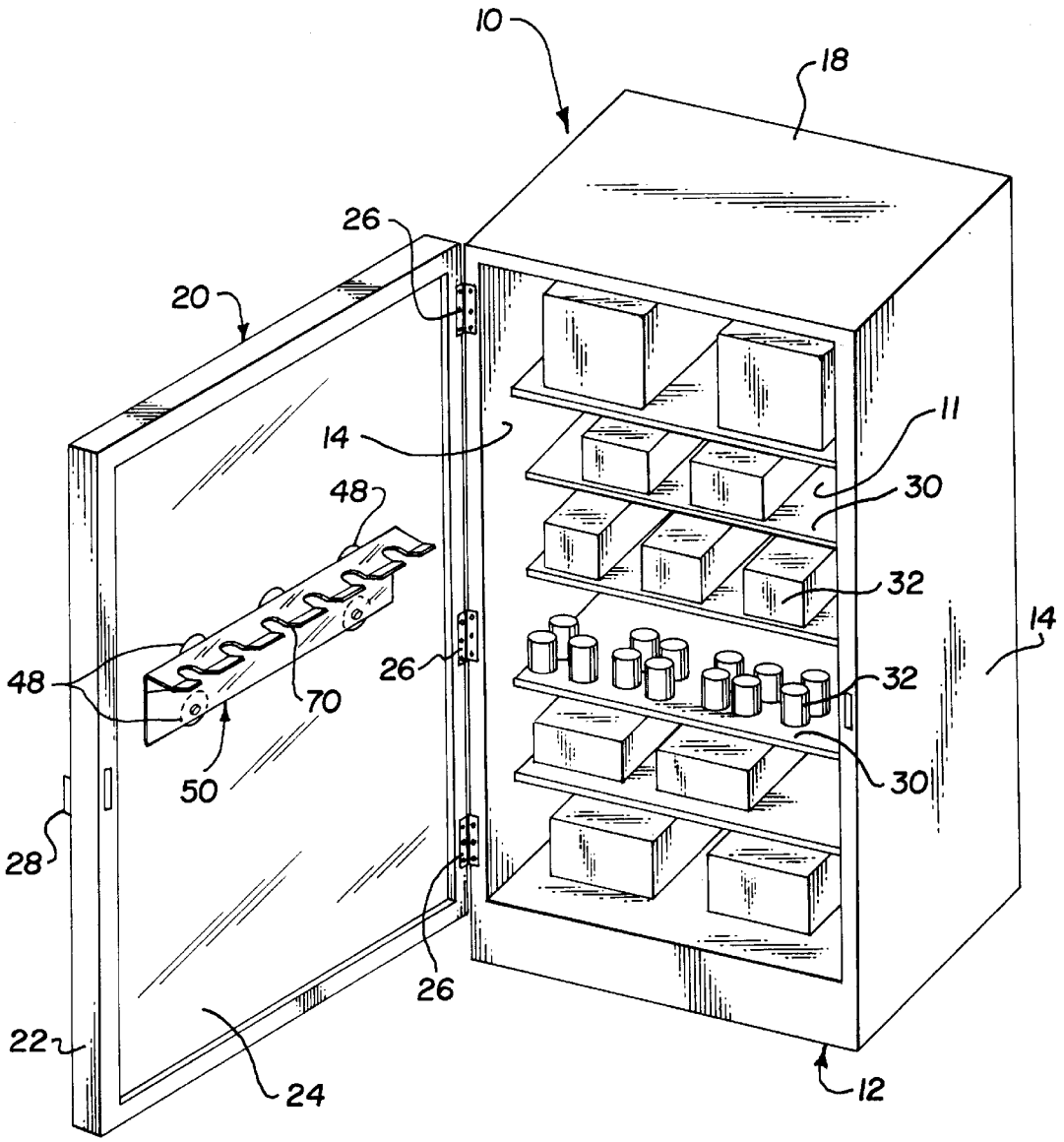
FIG. 2 is a perspective view of the refrigerated unit of FIG. 1 with the hinged door open.

FIGS. 1 and 2 show a typical refrigerator unit generally referred to by the numeral 10. The refrigerator unit 10 includes a thermally insulated compartment 11 defined by a base 12, side walls 14, back wall, top wall 18 and door 20. The refrigerator unit has a typical refrigeration system for chilling the interior of the compartment 11. As will hereinafter be described in detail, a bottle display rack (generally referred to by the numeral 50) is mounted to the interior surface of the door 20 of the refrigerated compartment. It will be readily recognized that although a free-standing refrigerator unit 10 is illustrated, the invention is equally applicable to large built-in vaults and the like currently used in retail outlets such as convenience stores and the like.

In the preferred embodiment of the invention the door 20 has a frame 22 for a transparent panel 24. The panel 24 is typically made of glass so that products within the refrigerator can be viewed from the outside. However, it is to be understood that the transparent panel 24 could be formed of plastic or other suitable transparent material. The door 20 is connected at hinges 26 to a side wall 14 of the refrigerator unit 10 to swing open and closed. The door frame 22 has a handle assembly 28 for convenient grasping of the door 20 to open and close the door. As best shown in FIG. 2, the refrigerator unit 10 has a plurality of shelves 30 supports in the compartment 11 between side walls 14. Assorted food and/or beverage products 32 can be positioned on the shelves 30 for displaying the products through the transparent panel 24.

In typical commercial refrigerated vaults there is a space between the forward end of shelves 30 and the transparent panel 24 of door 20 which is unused. It is, of course, desireable to utilize this dead space to maximize the capacity of the refrigerator.

Figure 3:
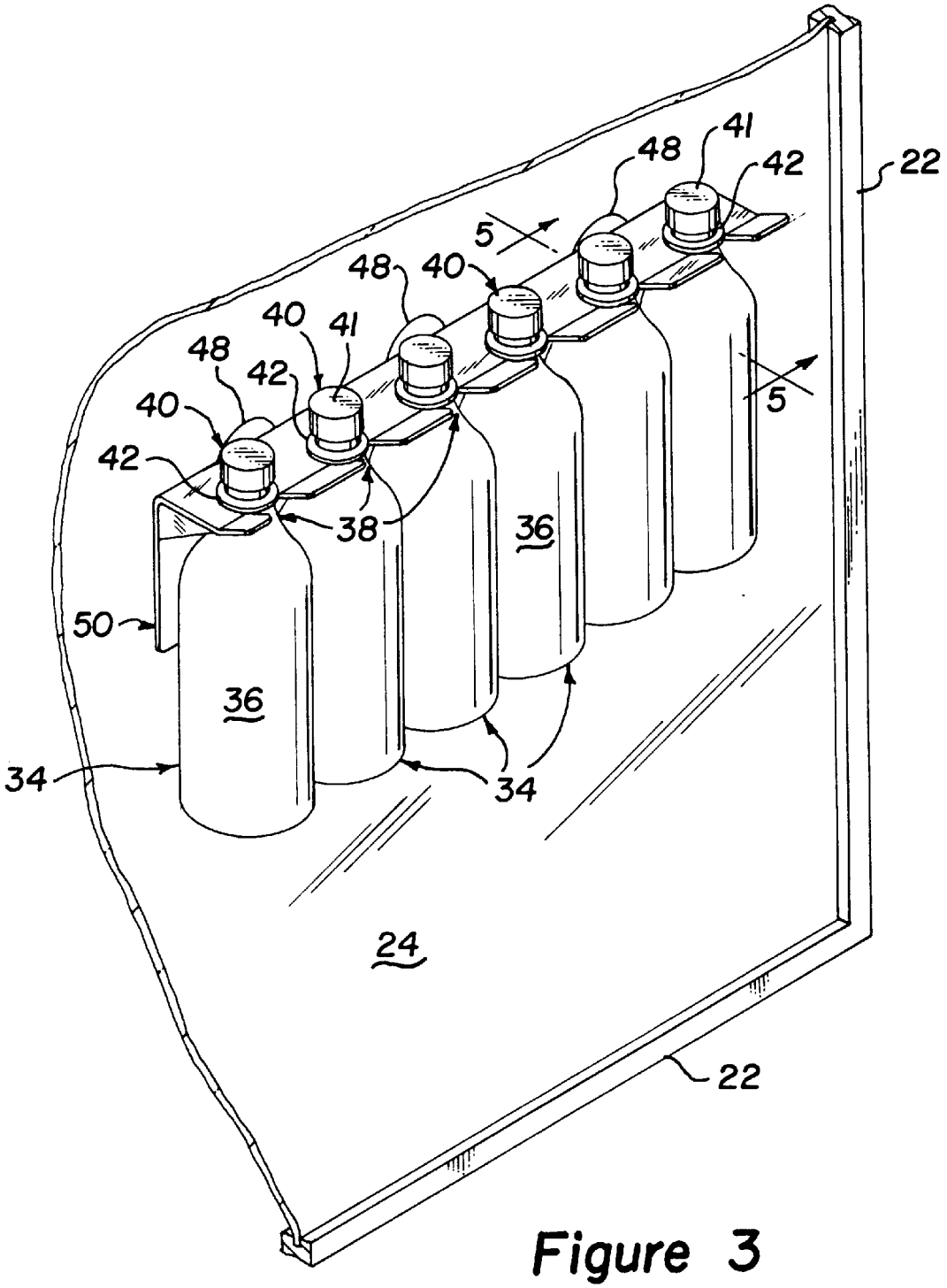
FIG. 3 is a perspective view of a display rack mounted to a refrigerator panel, the display rack having a plurality of bottles positioned thereon.

As shown in FIGS. 1–3 a bottle display rack 50 is releaseably mounted by a plurality of suction cups 48 to the interior surface of the transparent panel 24 of door 20. As best shown in FIG. 3, the bottle display rack 50 can be used to support one or more bottles 34. Typically, the bottles 34 will contain a consumable beverage which is preferably served chilled.

A typical plastic beverage bottle 34 has a relatively narrow neck portion 38 bounded below by a body portion 36 for containing the fluid and bounded above by a top portion 40 for sealing the bottle. The top portion 40 of a typical plastic bottle 34 includes a screw cap 41 and outwardly extending circumferential flange portion 42. It is to be understood that at least some element of the top portion 40 is larger in diameter than the neck portion 38, for example, the diameter of the screw cap 41 or the diameter of the flange portion 42.

For purposes of illustration, the display rack illustrated can accommodate up to six bottles. However, it is to be understood that the display rack 50 can be designed to accommodate any convenient number of bottles and that the particular dimensions of the rack is determined by the size, shape and number of the bottles to be displayed.

Figure 5:
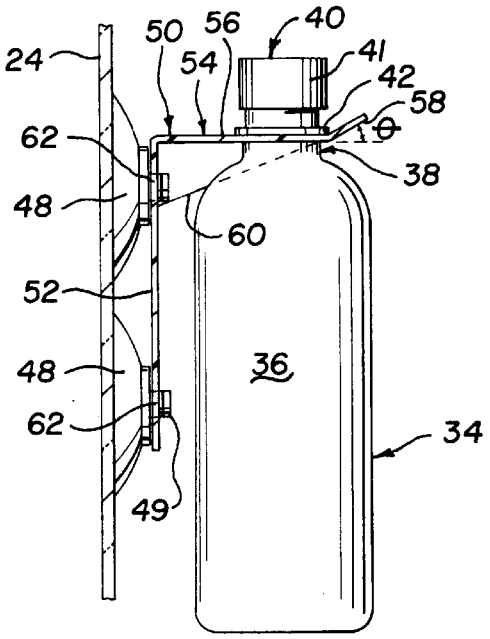
FIG. 5 is a cross-sectional view of the refrigerator panel and display rack of FIG. 3 taken along lines 5—5.
Figure 4:
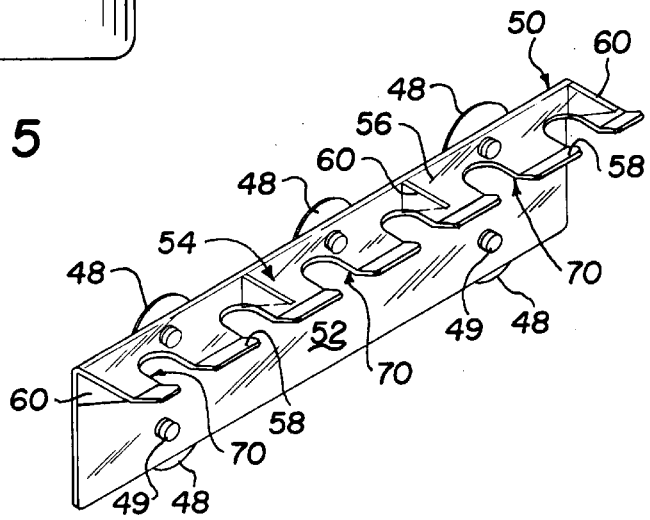
FIG. 4 is a perspective view of the display rack according to a preferred embodiment of the invention.
Figure 6:
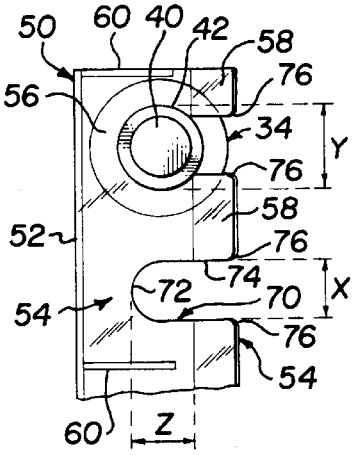
FIG. 6 is a top plan view of a portion of a display rack according to a preferred embodiment of the invention showing the slots for retaining bottles on the display rack.

The preferred embodiment of the display rack as illustrated in FIGS. 4–6, has a back wall 52 and a ledge 54 extending from the back wall 52. The back wall 52 is adapted for mounting the display rack adjacent a generally vertical interior surface of refrigerated compartment 11 such as against the transparent door panel 24. The ledge 54 has a generally horizontal portion 56 adjacent the back wall 52 and an upwardly deflected portion 58 distal from the back wall 52. The ledge 54 is reinforced and supported by a plurality of bracing walls or gussets 60 generally vertically oriented between the back wall 52 and the ledge 54. The back wall 52 has a plurality of apertures 62 formed therein for receiving and engaging the stems 49 of suction cups 48. The number and placement of the suction cups 48 depends on the number and size of the bottles 34 the display rack 50 is intended to accommodate. The suction cups 48 can be firmly connected to the back wall of the display rack 50 by conventional methods. For example, the stem 49 of the suction cup may have an enlarged head portion or threaded wing nut for retaining the suction cup in the aperture 62.

According to the presently preferred embodiment of the invention, the display rack 50 is formed entirely of substantially transparent material such as plastic and is secured to the interior of a transparent door panel 24 so the bottles 34 on the display rack 50 can be viewed and identified through the transparent panel 24 and the material of the display rack. As illustrated in FIG. 1, the back wall 52 can have indicia displayed thereon to advertise a product, for example, a bottled "COLA" beverage or the like. The particular design of the indicia 64 is, of course, a matter of marketing preference. The indicia 64 is preferably positioned on the back wall 52 so as not to interfere with the placement of the suction cups 48 on the display rack 50. If at least the back wall 52 of display rack 50 is formed of transparent material, the indicia 64 can be advantageously mounted to either surface of the back wall 52. Indicia 64 can be formed on the back wall 52 by various means [0] such as electrostatic mounting or the like or can be more permanently mounted with an adhesive.

As illustrated in FIG. 6, a plurality of slots 70 are formed in the ledge 54 for receiving the neck portions 38 of the bottles 34. Each slot 70 has a closed end 72 formed in the horizontal portion 56 of the ledge 54 and an open end 74 formed in the upwardly deflected portion 58 of the ledge 54. The closed end 72 of each slot 70 is preferably generally semi-circular in shape as shown. The slot 70 defines a passage having a width X sufficiently large to receive the narrow neck portion 38 of a bottle 34. The width X of the passage is also smaller then the outer diameter Y of a flange portion 42 on the top portion 40. Accordingly, the edges of a slot 70 in the ledge 54 support the bottle 34 at the neck portion 38 just below the flange 42 of top portion 40.

The closed end 72 of the slot 70 has a depth Z which is preferably at least as large as the circumference of the neck portion 38 below the flange 42. The overall depth of the horizontally portion 56 of ledge 54 is also at least as large as the depth Z of the slot 70 and more preferably sufficient so that at least one-half the circumference of the body portion 36 of a bottle 34 can be positioned in the closed end 72 of a slot 70 and beneath the horizontal portion 56 without touching the back wall 52. Thereby, as best shown in FIG. 5, the bottle 34 can be supported by the edges of a slot 70 in a generally vertical position for display. The open end 74 of the slot 70 has a depth which is preferably at least as large as one-half the diameter of the neck portion 38. In the embodiment of the invention illustrated in FIG. 6, the open end 74 of slot 70 is bounded by rounded corners 76. The rounded corners 76 can have, for example, a radius of about one-eighth the radius of the neck portion 38 of one of the bottles 34. The rounded corners 76 assist in guiding the neck portion 38 of a bottle into the open end 74 of slot 70.

Figure 7:
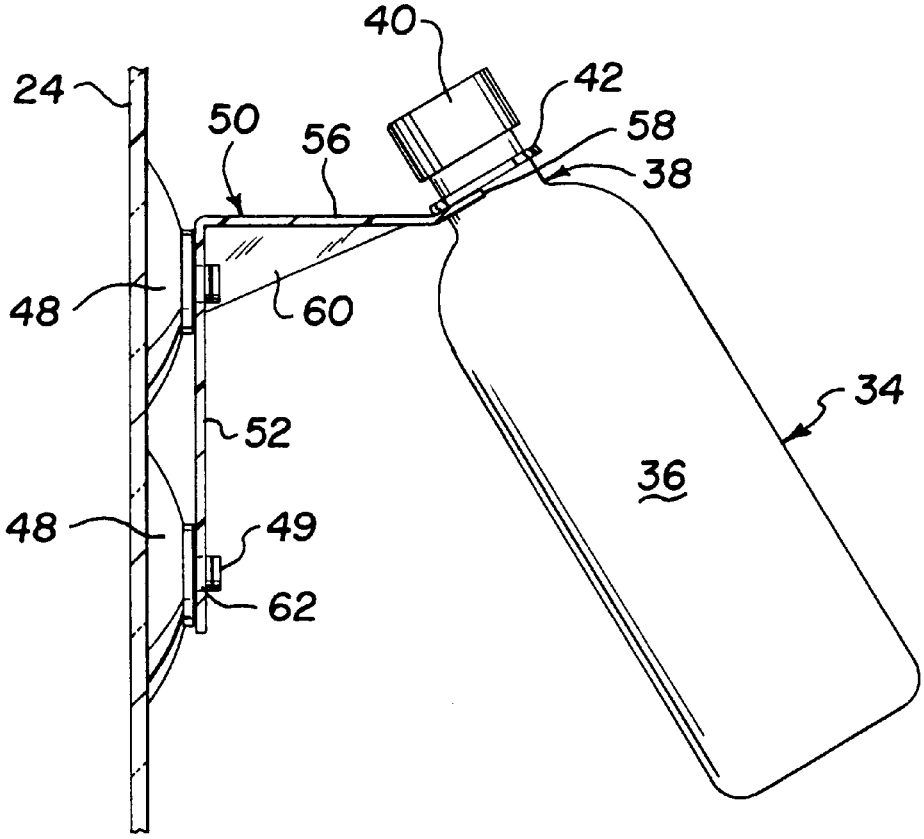
FIG. 7 illustrates a bottle retained on the upwardly deflected portion of the ledge of the display rack as the supporting door is opened or closed.

As illustrated in FIGS. 5 and 7 the preferred bottle display rack of the invention has an upwardly deflected portion 58 in the ledge 54. The angle [e] of the upwardly deflected portion 58 with respect to the generally horizontal portion 56 of ledge 54 is in the range of about 20° to 45°. In the presently preferred embodiment of the invention, the angle is preferably about 30°. When the door 20 of the refrigerator is forcefully and rapidly swung open about its hinges (as shown in FIG. 7), the motion of the transparent panel 24 of the door 20 tends to leave the bottle 34 behind and tends to move away from the back wall 52 of the display rack 50. The upwardly deflected portion 58 of the ledge 54 assists in preventing the bottle 34 from falling off the display rack 50. When the door 20 stops moving, the bottle 34 returns to the generally vertical orientation shown in FIG. 5 by force of gravity. When the door is swung about its hinges to the closed position, the motion of the transparent panel 24 of the door 20 tends to move toward the bottle 34 and the bottle 34 is retained on the display rack 50. However, a particularly energetic customer may close the door 20 of the refrigerator unit with such force that the momentum imparted to the bottle 34 causes it to tend to continue its motion after the door has stopped moving. The situation shown in FIG. 7 again comes into play and the upwardly deflected portion 58 of the ledge 54 assists in preventing the bottle 34 from falling off the display rack 50. Thereafter, the bottle 34 tends to return to the generally vertical orientation shown in FIG. 5.

It is to be understood that even though numerous characteristics and advantages of the invention have been set forth in the foregoing description together with details of the structure and function of the invention, this disclosure is to be considered illustrative only. Various changes and modifications may be made in detail, especially in matters of shape, size and arrangement of parts, without departing from the spirit and scope of the invention as defined by the appended claims.

What is claimed is:

1. A display rack supporting a plurality of bottles adjacent the interior surface of a substantially transparent wall of a refrigerated vault, each bottle having a body portion, a relatively narrow neck portion and a top portion, wherein the display rack comprises:

(a) a back wall having indicia thereon for advertising products contained within a refrigerated vault and mounting the display rack adjacent a generally vertical interior surface of a substantially transparent wall of said refrigerated vault, said back wall having a plurality of openings formed therein for connecting suction cups to said back wall so that the display rack can be removeably mounted to said interior surface;

(b) a ledge extending from said back wall, said ledge having a generally horizontal portion adjacent said back wall and an upwardly deflected portion distal from said back wall; and (c) a plurality of slots formed in said ledge, each of said slots being of a size adapted to receive the neck portion of a bottle but smaller than the lid portion, whereby the edges of the slots in the ledge support said bottles at the neck portions thereof and the body portions of the bottles can be easily grasped for selection and removal from the display rack.

2. A display rack as defined in claim 1 formed of substantially transparent material, whereby the display rack can be positioned adjacent a transparent panel of the refrigerated compartment and bottles on the display rack can be viewed and identified therethrough.

3. A display rack supporting a plurality of bottles, each bottle having a relatively narrow neck portion bounded by a body portion and a top portion, within a refrigerator having a refrigerated compartment and a door for opening and closing the refrigerated compartment mounted to the refrigerator by at least one hinge and having a substantially transparent panel for displaying products within the refrigerated compartment, said display rack comprising:

(a) a substantially transparent back wall mounting the display rack adjacent the transparent panel of the door;

(b) a ledge extending from said back wall having a generally horizontal portion adjacent said back wall and an upwardly deflected portion distal from said back wall;

(c) a plurality of slots in said ledge, each of said slots having a closed end in said horizontal portion of said ledge and an open end in said upwardly deflected portion of said ledge and being of a size to receive the neck portion of a bottle but smaller than the outer diameter *of* the top portion above the neck portion, whereby the edges of the slots in the ledge support the bottle at the neck portion and the body portion of the bottle can be easily grasped for selection and removal from the display rack, and whereby said upwardly deflected portion of said ledge assists in retaining the bottles on the display rack when the door is rapidly opened or closed.

4. A display rack as defined in claim 3 wherein the entire display rack is formed of transparent material for enhancing visibility of the products within the refrigerated compartment.

5. A display rack as defined in claim 3 wherein said closed end of each of said slots is generally semi-circular in shape to conform to at least part of the circumference of the neck portion of a bottle.

6. A display rack as defined in claim 3 wherein said closed end of each of said slots has a depth at least as large as the circumference of the neck portion of a bottle.

7. A display rack as defined in claim 6 wherein the overall depth of said horizontal portion of said ledge is larger than the depth of said slots in said horizontal portion of said ledge and sufficient so that at least one-half the circumference of the body portion of a bottle can be positioned in one of said slots and beneath said horizontal portion of said ledge without touching said back wall, whereby a bottle can be supported by one of said slots in a generally vertical position for display.

8. A display rack as defined in claim 3 wherein said open end of each of said slots in said upwardly deflected portion of said ledge has a depth at least as large as one-half the diameter of the neck portion of the bottle.

9. A display rack as defined in claim 3 wherein the angle of said upwardly deflected portion with respect to the generally horizontal portion of said ledge is in the range of about 20° to 45°.

10. A display rack as defined in claim 3 wherein the angle of said upwardly deflected portion with respect to the generally horizontal portion of said ledge is about 30°.

11. The combination comprising:

(a) a refrigerated compartment defined by bottom, side, back and top interior surfaces and a door pivotally mounted thereto by at least one hinge and having a transparent panel for displaying products within the refrigerated compartment; and (b) a display rack supporting a plurality of bottles adjacent the interior surface of said transparent panel, each bottle having a body portion, a relatively narrow neck portion and a top portion, wherein the display rack comprises (i) a back wall having indicia thereon for advertising products contained within the refrigerated compartment and mounting the display rack adjacent said transparent panel, said back wall having a plurality of openings formed therein for connecting suction cups to said back wall so that the display rack can be removeably mounted to said transparent panel;

(ii) a ledge extending from said back wall, said ledge having a generally horizontal portion adjacent said back wall and an upwardly deflected portion distal from said back wall; and (iii) a plurality of slots formed in said ledge, each of said slots being of a size adapted to receive the neck portion of a bottle but smaller than the lid portion, whereby the edges of the slots in the ledge support said bottles at the neck portions thereof and the body portions of the bottles can be easily grasped for selection and removal from the display rack.

12. The combination comprising:

(a) a refrigerated compartment defined by bottom, side, back and top interior surfaces and a door pivotally mounted thereto by at least one hinge and having a transparent panel for displaying products within the refrigerated compartment; and (b) a display rack supporting a plurality of bottles within said refrigerated compartment, each bottle having a relatively narrow neck portion bounded by a body portion and a top portion, wherein said display rack comprises (i) a substantially transparent back wall mounting the display rack adjacent the transparent panel of the door;

(ii) a ledge extending from said back wall having a generally horizontal portion adjacent said back wall and an upwardly deflected portion distal from said back wall; and (iii) a plurality of slots in said ledge, each of said slots having a closed end in said horizontal portion of said ledge and an open end in said upwardly deflected portion of said ledge and being of a size to receive the neck portion of a bottle but smaller than the outer diameter of the top portion above the neck portion, whereby the edges of the slots in the ledge support the bottle at the neck portion and the body portion of the bottle can be easily grasped for selection and removal from the display rack, and whereby said upwardly deflected portion of said ledge assists in retaining the bottles on the display rack when the door is rapidly opened or closed.

*13. A display rack supporting a plurality of bottles adjacent the interior surface of a substantially transparent wall of a refrigerated vault, each bottle having a body portion, a relatively narrow intermediate portion and a top portion, wherein the display rack comprises:*

*(a) a back wall having indicia thereon for advertising products contained within a refrigerated vault and mounting the display rack adjacent a generally vertical interior surface of substantially transparent wall of said refrigerated vault, said back wall having a plurality of openings formed therein for connecting suction cups to said back wall so that the display rack can be removeable mounted to said interior surface;*

*(b) a ledge extending from said back wall; and*

*(c) a plurality of slots formed in said ledge, each of said slots being of a size adapted to receive an intermediate portion of a bottle but smaller than the top portion whereby the edges of the slots in the ledge support said bottles at the intermediate portions thereof and the body portions of the bottles may be easily grasped for selection and removal from the display rack.*

*14. A display rack as defined in claim 13 wherein at least a portion of said ledge is upwardly deflected.*

*15. A display rack as defined in claim 13 formed of substantially transparent material, whereby the display rack may be positioned adjacent a transparent panel of the refrigerated vault and bottles on the display rack viewed and identified therethrough.*

*16. A display rack as defined in claim 13 wherein said ledge has a generally horizontal portion adjacent said back wall and an upwardly deflected portion distal from said back wall.*

*17. The combination comprising:*

*(a) a refrigerated compartment defined by bottom, side, back and top interior surfaces and a door pivotally mounted thereto by at least one hinge and having a transparent panel for displaying products within the refrigerated compartment; and*

*(b) a display rack supporting a plurality of bottles adjacent the interior surface of said transparent panel, each bottle having a body portion, a relatively narrow intermediate portion and a top portion, wherein the display rack comprises*

*(i) a back wall having indicia thereon for advertising products contained within a refrigerated compartment and mounting the display rack adjacent said transparent panel, said back wall having a plurality of openings formed therein for connecting suction cups to said back wall so that the display rack may be removeably mounted to said transparent panel;*

*(ii) a ledge extending from said back wall; and*

*(iii) a plurality of slots formed in said ledge, each of said slots being of a size adapted to receive an intermediate portion of a bottle but smaller than the top portion, whereby the edges of the slots in the ledge support said bottles at the intermediate portions thereof and the body portions of the bottles may be easily grasped for selection and removal from the display rack.*

*18. The combination defined in claim 17 wherein at least a portion of said ledge is upwardly deflected.*

*19. The combination defined in claim 17 wherein said ledge has a generally horizontal portion adjacent said back wall and an upwardly deflected portion distal from said back wall.*

* * * * *